May 1, 1956 P. W. PEARSON 2,743,809
CHAIN GUIDE STRUCTURE
Filed Sept. 27, 1950 3 Sheets-Sheet 2
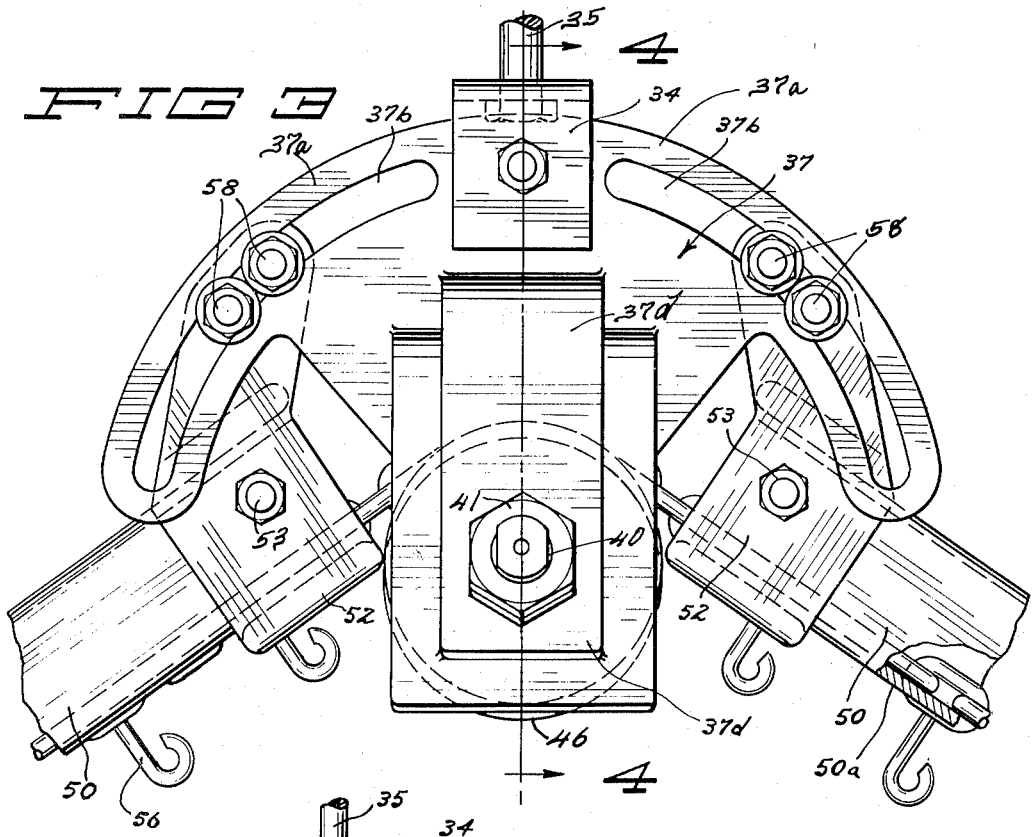
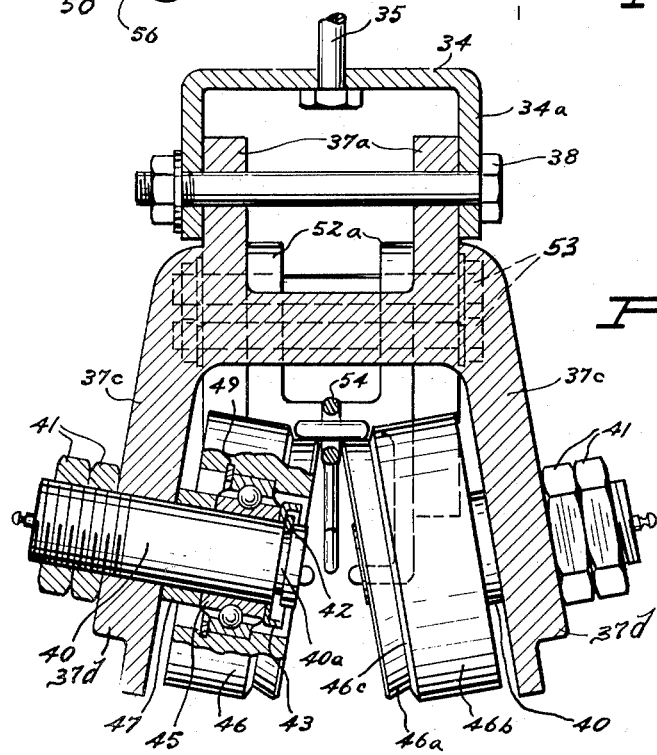
INVENTOR.
PAUL W. PEARSON
BY
Chas. C. Reif.
ATTORNEY May 1, 1956     P. W. PEARSON     2,743,809
CHAIN GUIDE STRUCTURE
Filed Sept. 27, 1950     3 Sheets-Sheet 3
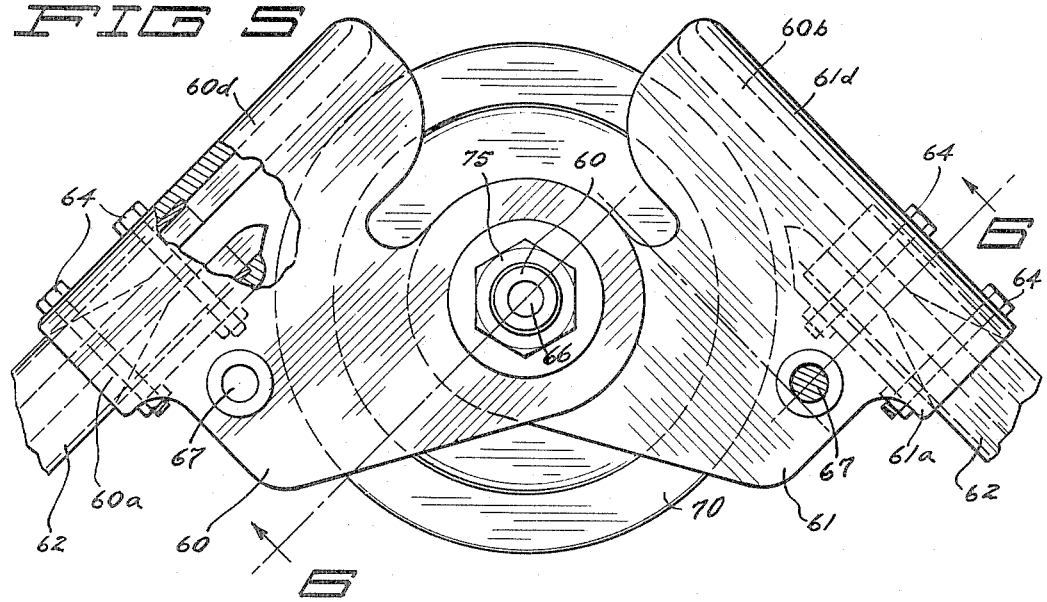
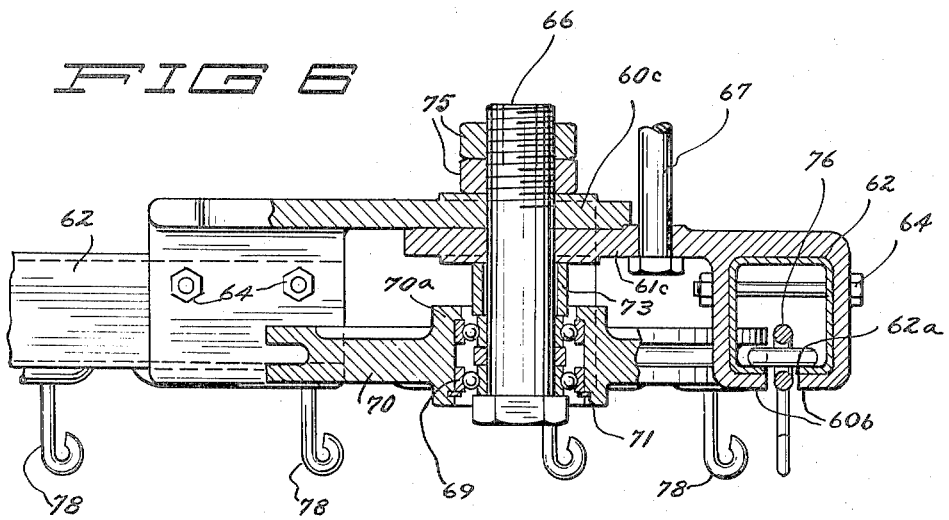
INVENTOR.
PAUL W. PEARSON
BY
Chas. C. Reif
ATTORNEY United States Patent Office 2,743,809
Patented May 1, 1956

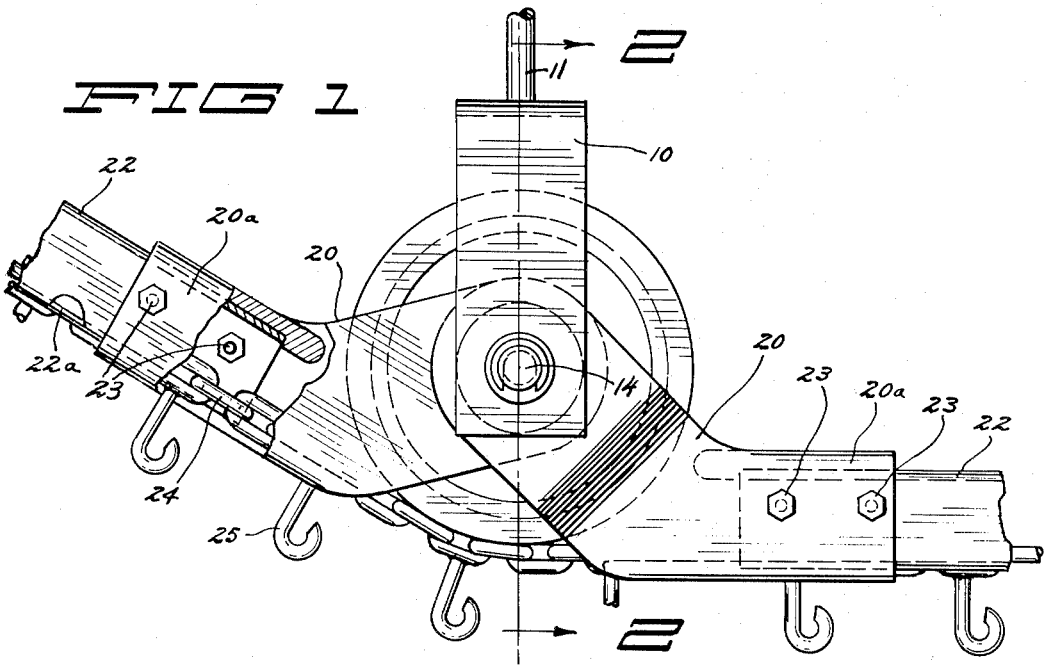
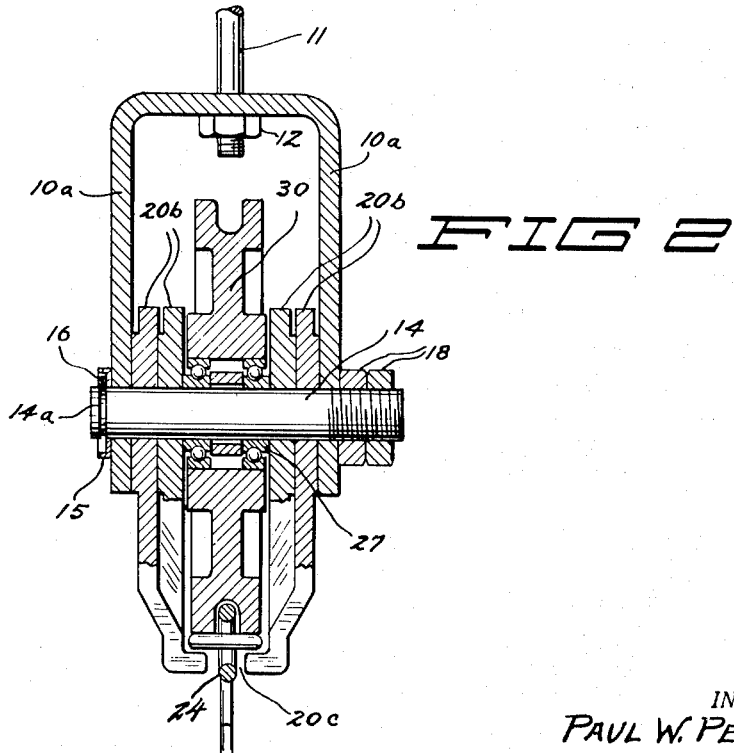

2,743,809

CHAIN GUIDE STRUCTURE

Paul W. Pearson, Chicago, Ill., assignor to
Verner G. Ellen, Minneapolis, Minn.

Application September 27, 1950, Serial No. 186,947

9 Claims. (Cl. 198—177)

This invention relates to a conveyor structure and particularly to a conveyor which has a flexible member such as a chain moving through supporting members preferably of substantially tubular form, said flexible member also moving over sheaves or rollers at different parts of the conveyor structure.

It is an object of this invention to provide a conveyor comprising a flexible member such as a chain, a plurality of members through which said chain moves and is guided, a roller over which said chain moves between said members, together with simple and efficient means for holding said plurality of members in different angular positions.

It is a further object of the invention to provide a conveyor structure comprising a movable flexible member such as a chain, a bracket which is carried by a fixed support, one or more sheaves rotatably supported by said bracket member, tubular members disposed respectively at each side of said sheave through which said flexible member passes, said flexible member also passing about said sheave, together with means for holding said tubular members at each side of said sheave in different angular positions.

It is another object of the invention to provide a conveyor structure comprising a pair of tubular members having slots in their lower sides, a flexible member such as a chain movable through said tubular members and having carrying members secured thereto movable through said slots, a pair of supporting members to which said tubular members are respectively secured, a member to which the ends of said supporting members are respectively secured and relatively to which they are movable, one or more rollers carried by said supporting members about which said flexible member moves, together with means for holding said supporting members in different angular positions.

It is more specifically an object of the invention to provide a conveyor structure comprising a hanger adapted to be carried from a fixed support, a bracket secured to said hanger, said bracket having spaced upper plate-like portions, said upper portions having arcuate slots therein respectively, said bracket also having depending spaced plate-like portions, one or more rollers carried between said last mentioned plate-like portions, a pair of tubular members at each side of said roller or rollers respectively, said tubular members having slots in their lower sides, a flexible member such as a chain moving through said tubular members and about said roller or rollers and having carrying members secured thereto movable through said slots, supporting members to which said tubular members are respectively secured, and means disposed in said arcuate slots and passing through said supporting members respectively for holding said supporting members in different positions in said slots respectively and holding said tubular members in different angular relation.

These and other objects and advantages of the invention will be fully set forth in the following description made in connection with the accompanying drawings in which like reference characters refer to similar parts throughout the several views and in which:

Fig. 1 is a view in side elevation of one form of the device of this invention, some parts being broken away and others shown in vertical section;

Fig. 2 is a vertical section taken substantially on line 2—2 of Fig. 1, as indicated by the arrows;

Fig. 3 is a view in side elevation of another form of the invention;

Fig. 4 is a vertical section taken substantially on line 4—4 of Fig. 3, as indicated by the arrows;

Fig. 5 is a view in side elevation of still another form of the invention; and

Fig. 6 is a section taken substantially on line 6—6 of Fig. 5, as indicated by the arrows.

Referring to the drawings, particularly Figs. 1 and 2, a conveyor structure is shown comprising a bracket 10, which in the embodiment of the invention shown is of general U shape having parallel side portions 10a. A rod 11 passes through an opening in the top of bracket 10 and bracket 10 is supported on a nut 12 threaded on the lower end of rod 11. Rod 11 will extend upwardly to a fixed support, such as a ceiling or means secured thereto. A stud 14 forming a pivot member extends through the sides 10a of bracket 10 and is held in position at one side of said bracket by a cup-shaped washer 15 having a spring wire-like washer 16 at its outer side resiliently held in a groove 14a in stud 14. The opposite end of stud 14 is threaded and equipped with nuts 18, the outer one of which forms a jamb or lock nut. A pair of supporting members 20 are provided, each having a substantially tubular outer end 20a. Said end portions 20a have slots 20c in their lower sides. A pair of substantially tubular members 22 are provided which are of general rectangular form in transverse cross section, the same having slots 22a in their lower sides which are in longitudinal alinement with the slots in portions 20a. The members 22 extend some distance into portions 20a and are secured therein by the headed and nutted bolts 23. A flexible member, such as a chain 24, is provided, and the same moves through members 22 and portions 20a. Said member 24 has secured thereto and depending therefrom spaced carrying means 25 shown as in the form of hooks. These hooks 25 pass through the slots 22a and the slots in the bottoms of portions 20a. The members 20 have spaced substantially parallel portions 20b extending from portions 20a at a substantial angle thereto and said portions 20b overlap and the ends thereof are disposed within the sides 10a of the bracket 10, as shown in Fig. 2. As shown in Fig. 2, the portions 20b of one of the members 20 are closer together than the portions 20b of the other member. Said portions 20b are apertured to have the stud 14 pass therethrough. A bearing 27, illustrated as a ball bearing, is carried on stud 14 between the adjacent members 20b, and a grooved roller or sheave 30 is journaled on bearing 27. The flexible member or chain 24 is composed of oblong links, each link being in one plane and the alternate links of said chain are disposed in planes substantially at right angles to each other. The chain thus has one set of links which, as shown in Figs. 1 and 2, are in a substantially vertical plane and it has another set of links disposed in a substantially horizontal plane.

In operation the articles to be conveyed are supported upon the hooks 25. The chain 24 is moved by a driven sprocket and said chain moves through the members 22, the set of links in a horizontal plane riding on the bottom of members 22, while the links disposed in a vertical plane move through the slots 22a. Said chain also passes about the lower side of the roller or sheave 30, as shown in Fig. 1. The chain must move in different directions according to where it is desired to move the objects supported upon the hooks 25. By loosening the nuts 18 the angular position of members 20 can be changed and when nuts 18 are tightened the members 20 will be held in fixed relation. The angular position of members 20 can thus be easily varied.

In the form of the invention shown in Figs. 3 and 4, a hanger bracket 34 is shown of general inverted U shape and having spaced substantially parallel side portions 34a. A headed rod 35 extends through the top of bracket 34, said bracket being supported on the head of said rod and the upper end of said rod will be connected to some suitable fixed support. A bracket 37 is provided, the same having upper spaced plate-like portions 37a and a headed and nutted bolt 38 extends through portions 37a and through the sides of bracket 34 so that bracket 37 is thus supported upon bolt 38 by bracket 34. The portions 37a are of considerable extent and they are each provided with a pair of arcuate slots 37b, as shown in Fig. 3. Bracket 37 also comprises a pair of spaced depending plate-like portions 37c which are shown as diverging toward their lower ends. The central portions 37d of portions 37c are of somewhat greater thickness than the remainder of said portions. A stud 40 is disposed in each of the plate-like portions 37c, each of which has a pair of nuts 41 threaded on its outer end, the inner one of which engages the outer side of portion 37c. The outer nut will constitute a jamb or lock nut. Said studs 40 are provided with annular grooves 40a adjacent their inner ends in which is disposed a resilient divided washer 42, the same engaging and holding in place a cup-shaped washer 43 surrounding each stud 40. A bearing 45, shown as a ball bearing, is carried on each stud 40 and engages washer 43, and a roller 46 is rotatable on each of the bearings 45. Each bearing 45 is held in place on its stud 40 by a collar 47 and each roller 46 is held in place by an annular washer 49 carried therein and engaging one side of the bearing 45. The studs 40 are perpendicular to the side portions 37c so that they incline downwardly toward their inner ends. The rollers 46 are thus at an angle to each other and the adjacent faces thereof diverge downwardly. Each roller 46 is provided with a frusto-conical or substantially cylindrical surface 46a and with a larger cylindrical surface 46b, the latter surface extending through the major part of the width of said roller. A shoulder 46c is thus formed on each of said rollers. A pair of substantially tubular members 50 are provided, the same being substantially rectangular in transverse cross section and each of which has a slot 50a extending longitudinally thereof in the lower side thereof. Supporting members 52 are provided having lower portions which are substantially rectangular in transverse cross section with a slot or opening extending longitudinally through the bottom thereof. The members 50 substantially fit into members 52 and extend therein to a considerable distance, said members 50 being secured to members 52 by headed and nutted bolts 53. A flexible member 54, which may be in the form of a chain, is provided, and this is movable through members 50 and over the rollers 46. Chain 54 is composed of alternate oblong links, each of which is disposed in one plane, and the alternate links of said chain are disposed in planes substantially at right angles to each other. The chain has thus one set of links disposed in a substantially vertical plane and another set of links disposed in a substantially horizontal plane. Chain 54 has spaced carrying members 56 secured to and depending therefrom, the same being shown as in the form of hooks. Members 56 move through the slots 50a in the members 50. The members 52 have spaced upper plate-like portions 52a and these are disposed between and substantially contact the adjacent sides of the plate-like portions 37a, as shown in Fig. 4. A pair of headed and nutted bolts 58 extend through each of the slots 37b and through the portions 52a. The members 52 can thus be clamped and held in various positions in slots 37b by the bolts 58. It will be seen that this will vary the angular relation of members 50.

In the operation of the device shown in Figs. 3 and 4, the members to be conveyed will be supported by the hooks 56. The chain 54 will be suitably driven and as the chain passes through the members 50 the links thereof disposed in the horizontal plane will slide upon the bottom flanges of the members 50 and the links disposed in the vertical plane will move through the slots in the bottoms of members 50 respectively. When the chain passes over the rollers 46 the links which are disposed in a horizontal plane will be supported on the surfaces 46a and the links which are disposed in a vertical plane together with the hooks 56 will move through the space between the rollers 46, as shown in Fig. 4. As stated, members 50 can be disposed in various positions on member 37 so that the chain will travel in desired directions. The hanger 34 will be suspended from a beam or ceiling above the hanger by the bolt 35.

In Figs. 5 and 6 another form of the invention is shown. A pair of members 60 and 61 are shown which are of similar construction except that they are reversely constructed. Each comprises a channel-shaped portion 60a and 61a respectively, the same having a slot 60b extending longitudinally in the bottom thereof. Substantially tubular-shaped members 62 are received in the ends of the portions 60a and 61a and are secured therein by the headed and nutted bolts 64. Members 62 have a slot 62a extending longitudinally in the bottoms thereof, as shown in Fig. 6. As shown in Fig. 6, slots 60b and 62a are in vertical alinement. The device as shown in Fig. 5 is designed to be in a horizontal plane. Members 60 and 61 have flanged portions 60c and 61c which overlap and are bored to receive a headed and nutted bolt 66. A hanger or supporting bolt 67 extends through each of the flanges 60c and 61c and these bolts will extend upwardly to a beam ceiling or other suitable support. A bearing, shown as a ball bearing 69, is supported upon the head of the bolt 66 and disposed in a bore of the hub 70a of a sheave 70. Said bearing 69 contacts a shoulder at the upper side of said bore and a supporting ring or washer 71 at the lower side of said bore. Bearing 69 is also held in proper position by a collar 73 loosely surrounding the bolt 66. The members 60 and 61 have shroud portions 60d and 61d which overlie the sheave 70 and have flanges extending substantially vertically along the grooved side of said sheave. Bolt 66 has two nuts 75 thereon, the outer one of which constitutes a jamb or lock nut. A chain 76 moves through members 62, the portions 60a and 61a and around one side of the sheave 70. The chain 76 is similar to the chains 24 and 54 already described. The chain 76 has secured to the links thereof which are in vertical planes, the supporting depending hooks 78.

In the operation of the device shown in Figs. 5 and 6, the chain 76 moves through members 62 and around one side of sheave 70. The links thereof which are in horizontal planes ride on the bottom flanges of the members 62, the same spanning the slots 60b and 62a, as shown in Fig. 6. The links which are in a vertical plane pass through slots 60b and 62a and the depending hooks 78 are in alinement with said slots. The chain 76 will be suitably driven and can thus conveniently pass through the parts described. The shroud portions 60d and 61d hold the chain adjacent the sheave 70. The members 60 and 61 can be moved to different circumferential positions relatively to sheave 70 and they will be clamped in such positions by the bolt 66. The direction of travel of the chain can thus be changed to suit the conditions in the place where the conveyor is used.

From the above description it will be seen that I have provided a very simple and yet very efficient and useful structure of conveyor. By the structure above described and shown on the drawings the direction of chain travel can be easily and quickly and accurately determined. This is true whether the chain is traveling in an upwardly or downwardly direction or whether it travels in a horizontal plane. The parts are comparatively simple and are easily and quickly assembled. The device has been amply tested in actual practice, found to be very successful and efficient, and the same is being commercially manufactured.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A conveyor structure having in combination, a pair of tubular members having slots in their lower sides, a chain having plain oblong links with alternate links in planes at right angles to each other adapted to move through said tubular members, carrying members on certain of said links adapted to pass through said slots, a pair of second members to which said tubular members are respectively secured, a third member having spaced side portions, rollers respectively carried by said side portions having supporting peripheries, and means for securing said second members to said third member at opposite sides of said rollers respectively, alternate links of chain passing between said rollers and alternate links of said chain riding on said cylindrical surfaces.

2. The structure set forth in claim 1, studs carried in said side portions respectively, bearing carried on said studs on which said rollers are respectively rotatable.

3. The structure set forth in claim 1, said rollers having their axes converging downwardly and having other cylindrical surfaces of greater diameter than said cylindrical surfaces and forming shoulders adjacent said first mentioned cylindrical surfaces, said shoulders acting as guides for said set of links which ride on said first mentioned cylindrical surfaces.

4. The structure set forth in claim 1, said third member having laterally spaced upper plate-like portions having arcuate slots therein respectively at each side of the axis of said roller respectively, said slots being substantially concentric with the axes of said rollers, said second members having upper portions fitting between said last mentioned plate-like portions and bolts passing through said slots and upper portions for holding said second members in different angular positions in said slots respectively for varying the angle between said tubular members.

5. A conveyor structure having a combination, a bracket having spaced vertically extending plate-like flanges, a hanger having spaced substantially parallel sides which extend along the remote sides of said flanges, means connecting said flanges and hanger, said flanges extending at each side of said hanger, a pair of spaced tubular members of general rectangular form in cross section having slots in their bottoms respectively, a pair of members in which the ends of said tubular members are respectively secured, each of said pair of members having flanges disposed between the flanges of said bracket, means for holding each of said pair of members in different positions on said flanges to vary the angular relation of said tubular members, a chain having alternate links disposed in planes substantially at right angles to each other movable through said tubular members, carrying members secured to and depending from links of said chain and movable through said slots, said bracket having spaced depending flanges and revoluble means over which said chain passes carried by said last mentioned flanges.

6. The structure set forth in claim 5, said revoluble means comprising spaced rollers, pivot members carried in said last mentioned flanges on which said rollers are respectively rotatable, the links in said chain disposed in vertical planes and said carrying members passing between said rollers and the links disposed in a horizontal plane being supported upon said rollers.

7. The structure set forth in claim 5, said first mentioned flanges having arcuate slots therein substantially concentric with the axes of said pivot members and said first mentioned means comprising headed and nutted bolts passing through said arcuate slots for holding said second pair of members in fixed position.

8. A conveyor structure having in combination, a pair of members of substantially tubular form having slots in their lower sides, second members in which said members respectively are carried, a chain movable through said first mentioned members and having alternate links supported on and riding on said members, a bracket having downwardly diverging flanges disposed between said second members, rotatable means carried by said flanges over which said chain runs, said bracket having plate-like portions with arcuate slots at each side respectively of the axis of said rotatable means, and means passing through said arcuate slots respectively and supporting said second members respectively and adapted to be held in different positions in said arcuate slots.

9. The structure set forth in claim 8, a second bracket embracing said plate-like portion between said arcuate slots, and a member extending through said brackets having an axis vertically alined with the axes of said rotatable means and supporting said first mentioned bracket.

References Cited in the file of this patent

UNITED STATES PATENTS

| Number | Name | Date |
|---|---|---|
| 349,520 | Samuel | Sept. 21, 1886 |
| 428,675 | Holt | May 7, 1890 |
| 684,776 | Barnes | Oct. 22, 1901 |
| 1,194,133 | Brown | Aug. 8, 1916 |
| 1,902,873 | Marone | Mar. 28, 1933 |
| 2,297,632 | Mosley | Sept. 29, 1942 |
| 2,349,578 | Ellen | May 23, 1944 |